| (12) | United States Patent | (10) Patent No.: | US 9,329,936 B2 |
|---|---|---|---|
| | Hickman | (45) Date of Patent: | May 3, 2016 |

(54) REDUNDANT EXECUTION FOR RELIABILITY IN A SUPER FMA ALU

(71) Applicant: Intel Corporation, Santa Clara, CA (US)

(72) Inventor: Brian J. Hickman, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 13/732,228

(22) Filed: Dec. 31, 2012

(65) Prior Publication Data

US 2014/0189305 A1 Jul. 3, 2014

(51) Int. Cl.
*G06F 9/00* (2006.01)
*G06F 11/00* (2006.01)
*G06F 11/14* (2006.01)
*G06F 11/16* (2006.01)

(52) U.S. Cl.
CPC ............ *G06F 11/14* (2013.01); *G06F 11/1497* (2013.01); *G06F 11/1608* (2013.01); *G06F 2201/845* (2013.01)

(58) Field of Classification Search
None
See application file for complete search history.

(56) References Cited

U.S. PATENT DOCUMENTS

| 4,402,044 A | 8/1983 | McDonough et al. |
|---|---|---|
| 4,422,143 A | 12/1983 | Guttag |
| 4,464,716 A | 8/1984 | Young |
| 4,480,306 A | 10/1984 | Bachman et al. |
| 4,482,953 A | 11/1984 | Burke |
| 4,589,067 A | 5/1986 | Porter et al. |
| 4,811,211 A | 3/1989 | Sandman et al. |
| 4,866,652 A | 9/1989 | Chu et al. |
| 4,926,355 A | 5/1990 | Boreland |
| 5,119,484 A | 6/1992 | Fox |
| 5,136,536 A | 8/1992 | Ng |
| 5,594,912 A | 1/1997 | Brueckmann et al. |
| 6,009,505 A * | 12/1999 | Thayer ................ G06F 9/30014 708/514 |
| 6,061,521 A * | 5/2000 | Thayer ................ G06F 9/30014 708/520 |
| 6,519,694 B2 | 2/2003 | Harris |
| 7,047,397 B2 | 5/2006 | Segelken |
| 7,475,229 B2 | 1/2009 | Feghali et al. |
| 7,689,639 B2 | 3/2010 | Dent |
| 7,707,236 B2 | 4/2010 | Srivastava |
| 7,711,764 B2 | 5/2010 | Dent |
| 8,108,610 B1 | 1/2012 | Glasco et al. |
| 8,135,926 B1 | 3/2012 | Glasco et al. |
| 2001/0056530 A1 | 12/2001 | Harris |
| 2004/0054875 A1 | 3/2004 | Segelken |
| 2005/0005203 A1* | 1/2005 | Czajkowski ........ G06F 11/1497 714/47.1 |
| 2005/0055607 A1* | 3/2005 | Czajkowski ............ G06F 11/00 714/25 |

(Continued)

*Primary Examiner* — Michael Sun
(74) *Attorney, Agent, or Firm* — Trop, Pruner & Hu, P.C.

(57) ABSTRACT

A system, processor and method to increase computational reliability by using underutilized portions of a data path with a SuperFMA ALU. The method allows the reuse of underutilized hardware to implement spatial redundancy by using detection during the dispatch stage to determine if the operation may be executed by redundant hardware in the ALU. During execution, if determination is made that the correct conditions exists as determined by the redundant execution modes, the SuperFMA ALU performs the operation with redundant execution and compares the results for a match in order to generate a computational result. The method to increase computational reliability by using redundant execution is advantageous because the hardware cost of adding support for redundant execution is low and the complexity of implementation of the disclosed method is minimal due to the reuse of existing hardware.

25 Claims, 6 Drawing Sheets

(56) References Cited

U.S. PATENT DOCUMENTS

| | | |
|---|---|---|
| 2005/0273481 A1 | 12/2005 | Dent |
| 2005/0273483 A1 | 12/2005 | Dent |
| 2006/0036667 A1 | 2/2006 | Sriivastava |
| 2006/0053188 A1* | 3/2006 | Mantor ............... G06F 11/2028 708/490 |
| 2006/0149932 A1 | 7/2006 | Gerardus de Vries |
| 2006/0174094 A1 | 8/2006 | Lloyd et al. |
| 2006/0206693 A1 | 9/2006 | Segelken |
| 2008/0069337 A1* | 3/2008 | Gopal ..................... G06F 7/535 380/28 |
| 2008/0189524 A1 | 8/2008 | Poon et al. |
| 2011/0035569 A1 | 2/2011 | Col et al. |
| 2011/0035570 A1 | 2/2011 | Col et al. |
| 2011/0161630 A1* | 6/2011 | Raasch ............... G06F 3/30196 712/205 |
| 2011/0264897 A1 | 10/2011 | Henry et al. |
| 2012/0216012 A1 | 8/2012 | Vorbach et al. |
| 2012/0260071 A1 | 10/2012 | Henry et al. |
| 2012/0260074 A1 | 10/2012 | Henry et al. |
| 2012/0260075 A1 | 10/2012 | Henry et al. |
| 2014/0189319 A1* | 7/2014 | Bradford ............... G06F 9/3001 712/221 |

\* cited by examiner

REDUNDANT EXECUTION FOR RELIABILITY IN A SUPER FMA ALU

FIELD

The present disclosure relates to microprocessors, and in particular, the arithmetic logic units that a microprocessor may employ.

BACKGROUND

Microprocessors generally include one or more arithmetic logic units (ALUs) in the execution pipeline to perform arithmetic and logical operations. ALUs may be characterized by the number of input operands and/or the number of mathematical and logical operations that they support. Some combinations of mathematical operations occur sufficiently often to justify the inclusion of a customized data path in an ALU to accommodate a specific operation. For example, an ALU may accommodate a fused multiply-add (FMA) operation in which the product of two floating point values is added to an accumulated floating point value using a single operation and rounding. Determining whether to implement a specific mathematical operation in a special purpose or complex ALU involves a cost/performance tradeoff. A factor that may influence any such determination is the extent to which a complex ALU may be utilized to perform simpler operations at times when no pending operation requires the full functionality of the complex ALU and/or or the extent to which an underutilized ALU may be employed to improve reliability via redundant execution of less complex instructions.

DESCRIPTION

DESCRIPTION OF THE EMBODIMENT(S)

Embodiments of disclosed inventions pertain to improving computational reliability in computing systems generally and large scale computing systems particularly. In at least one embodiment, a disclosed method increases computational reliability by leveraging resources in a complex ALU to perform redundant computations during times when the full functionality of the ALU is not required. Depending upon the specific instruction being executed and a mode of execution, the resources of the complex ALU may be used to perform a relatively less demanding operation redundantly, a relatively complex operation without redundancy, or the relatively complex operation redundantly using temporal redundancy.

In at least one embodiment, the complex ALU includes resources to perform two floating point, fused multiply-add (FMA) operations independently. In these embodiments, the complex ALU may be referred to as a SuperFMA ALU to denote that the ALU includes sufficient resources to perform an initial FMA operation and a dependent FMA operation based on the results of the independent FMA operation. In some of these embodiments, the SuperFMA ALU may be invoked to perform a simple FMA using spatial redundancy, to perform a complex FMA operation, also referred to herein as a SuperFMA operation, without redundancy, or to perform the SuperFMA redundantly using temporal redundancy by generating first and second computational results and comparing the two results. If the first and second results match, the computational result is confirmed whereas, if the first and second results don not match, an error signal is generated.

In at least one embodiment, a redundant execution mode is determined from a redundant execution signal. The redundant execution signal indicates a preferred redundant execution mode indicated by a reliability controller. The redundant execution mode may determine the manner in which the ALU performs operations.

In at least one embodiment, several different modes of execution support various degrees of redundant execution support. Some embodiments may include a mandatory mode, in which all operations are executed redundantly, either spatially or temporally. SuperFMA operations or other complex operations which cannot be executed with spatial redundancy in the ALU will be required to execute using temporal redundancy At least one embodiment includes an opportunistic execution mode, in which all operations that can be executed with spatial redundancy are always executed redundantly. In this mode, operations that cannot be executed using spatial redundancy are executed without redundancy. At least one embodiment further supports a reluctant execution mode, in which operations that can be executed with spatial redundancy may be executed with spatial redundancy subject to satisfaction of additional criteria. The additional criteria may include, but are not limited to, criteria pertaining to power consumption and/or a power management state, junction temperature, performance, and so forth. In the reluctant mode, if the operations do not support redundant execution, the operation will execute without redundancy.

In at least one embodiment, a disclosed processor includes multiple execution cores and associated cache memories. In at least one embodiment, the execution cores include an ALU, sometimes referred to herein as a SuperFMA ALU, to receive multiple inputs and perform a SuperFMA computation during an execution stage. In at least one embodiment, dispatch logic determines whether the operation to be performed by the ALU can be executed with spatially-based redundant execution support. If the ALU cannot perform the operation with redundant execution support, at least one embodiment of the ALU performs the operation without redundant execution and generates a computational result. In some embodiments, if the ALU is capable of executing the operation with redundant support, the ALU may do so depending upon a current state of a redundant execution signal indicating the current redundant execution mode.

In at least one embodiment, the ALU performs a Super-FMA computation with temporal redundancy and generates first and second results. In at least one embodiment, responsive to the first and second results matching, the ALU generates a confirmed computational result. In at least one embodiment, responsive to the first and second results of the redundant execution not matching, an error is generated.

In another embodiment, a disclosed multiprocessor system includes a first processor and storage accessible to the first processor. The storage includes an operating system. The operating system may include a processor-executable resume module with instructions to reduce latency associated with transitioning from a power conservation state. The operating system may also include a processor-executable connect module with instructions to maintain a currency of a dynamic application during the power conservation state.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
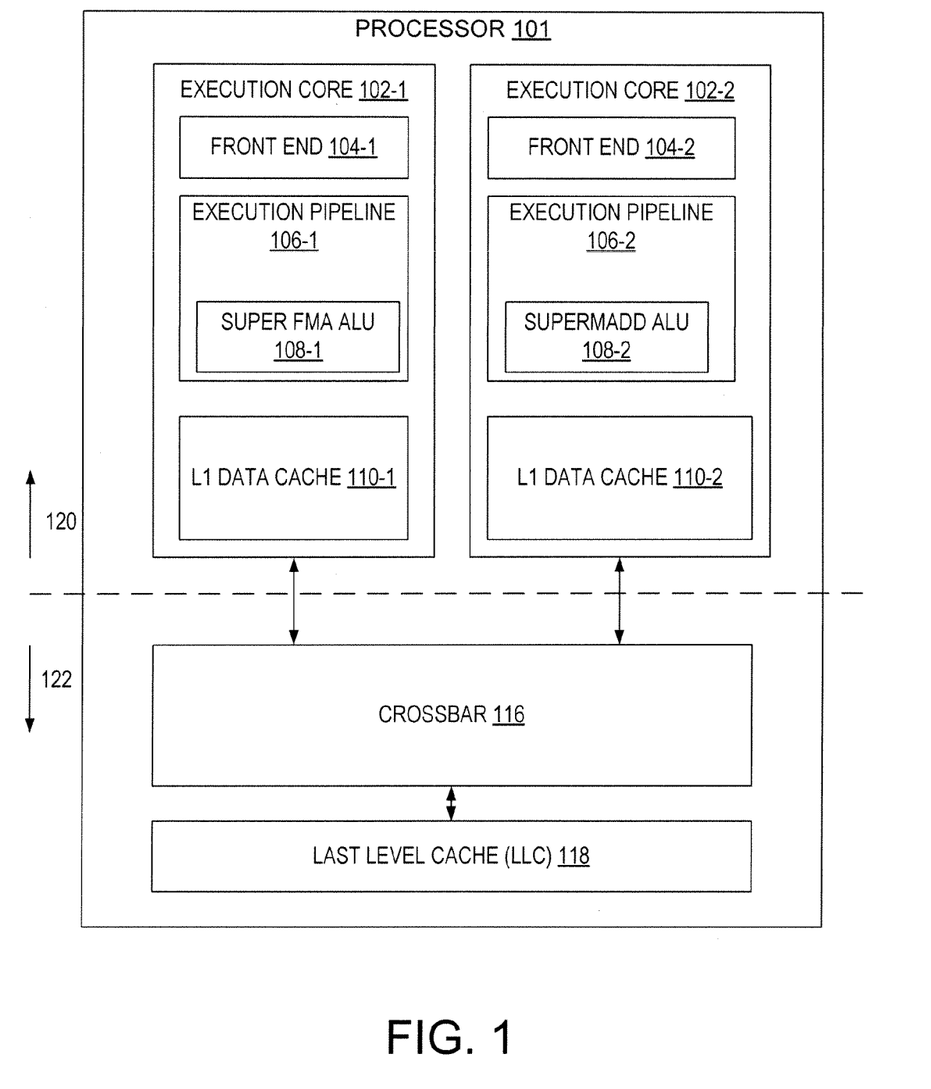
FIG. 1 illustrates a multi-core processor used in conjunction with at least one embodiment.

Referring now to FIG. 1, an embodiment of a processor 101 is illustrated. While the FIG. 1 embodiment of processor 101 is a multi-core processor including a plurality of processor cores, other embodiments encompass single core processors as well. The FIG. 1 embodiment of processor 101 includes an core region 120 and a non-core region 122. Core region 120 includes first execution core 102-1 and second execution core 102-2, while non-core region 122 includes a crossbar 116 and a shared cache memory referred to as a last level cache (LLC) 118. Although two execution cores 102 are depicted in the FIG. 1 embodiment, a different number of execution cores 102 may be employed in other embodiments. The FIG. 1 embodiments of execution cores 102 include a number of sub-systems that provide different aspects of overall functionality. For example, the embodiment of execution cores 102 depicted in FIG. 1 includes a front-end 104, and execution pipeline 106 including a SuperFMA ALU 108, and a local or L1 data cache 110.

In the FIG. 1 embodiment, front-end 104 may fetch instruction from an instruction cache (not depicted) and issue the instructions to execution pipeline 106. Execution pipeline 106 may decode the instructions into microcode, acquire values for any operands, and execute an operation corresponding to the applicable instruction. Thus, front-end 104 may be responsible for ensuring that a steady stream of operations is fed to execution pipeline 106.

Execution pipeline 106 may be responsible for scheduling and executing micro-operations and may include buffers for reordering micro-operations and a number of execution ports (not shown in FIG. 1). During operation, memory requests from execution pipeline 106 may first access L1 data cache 110 before looking up any other caches within a system. In the embodiment shown in FIG. 1, L1 data cache 110 may be a final lookup point for each execution core 102 before a request is issued to the LLC 118, which is a shared among the execution cores 102 of processor 101. Thus, L1 data cache 110 and last level cache 118 represent a cache hierarchy in the depicted embodiment.

The FIG. 1 embodiment of execution pipelines 106 include a SuperFMA ALU 108. SuperFMA ALU 108 is representative of a complex ALU that includes multiple instances of functional logic blocks to support a special purpose operation. In at least one embodiment, SuperFMA ALU 108 includes logic to perform a two-part FMA operation based on 5 floating point inputs 226 These multiple instances of resources may be used to achieve improved reliability during times when the resources might otherwise sit idle when the ALU is being utilized to perform an operation that does not fully utilize its resources.

In the FIG. 1 embodiment of processor 101, first execution core 102-1 and second execution core 102-1 do not communicate directly with each other, but instead communicate via crossbar 116, which may include intelligent functionality such as cache control, data queuing, P-P protocols, and multi-core interfacing. Crossbar 116 may thus represent an intelligent uncore controller that interconnects execution cores 102 with last level cache (LLC) 118.

Figure 2:
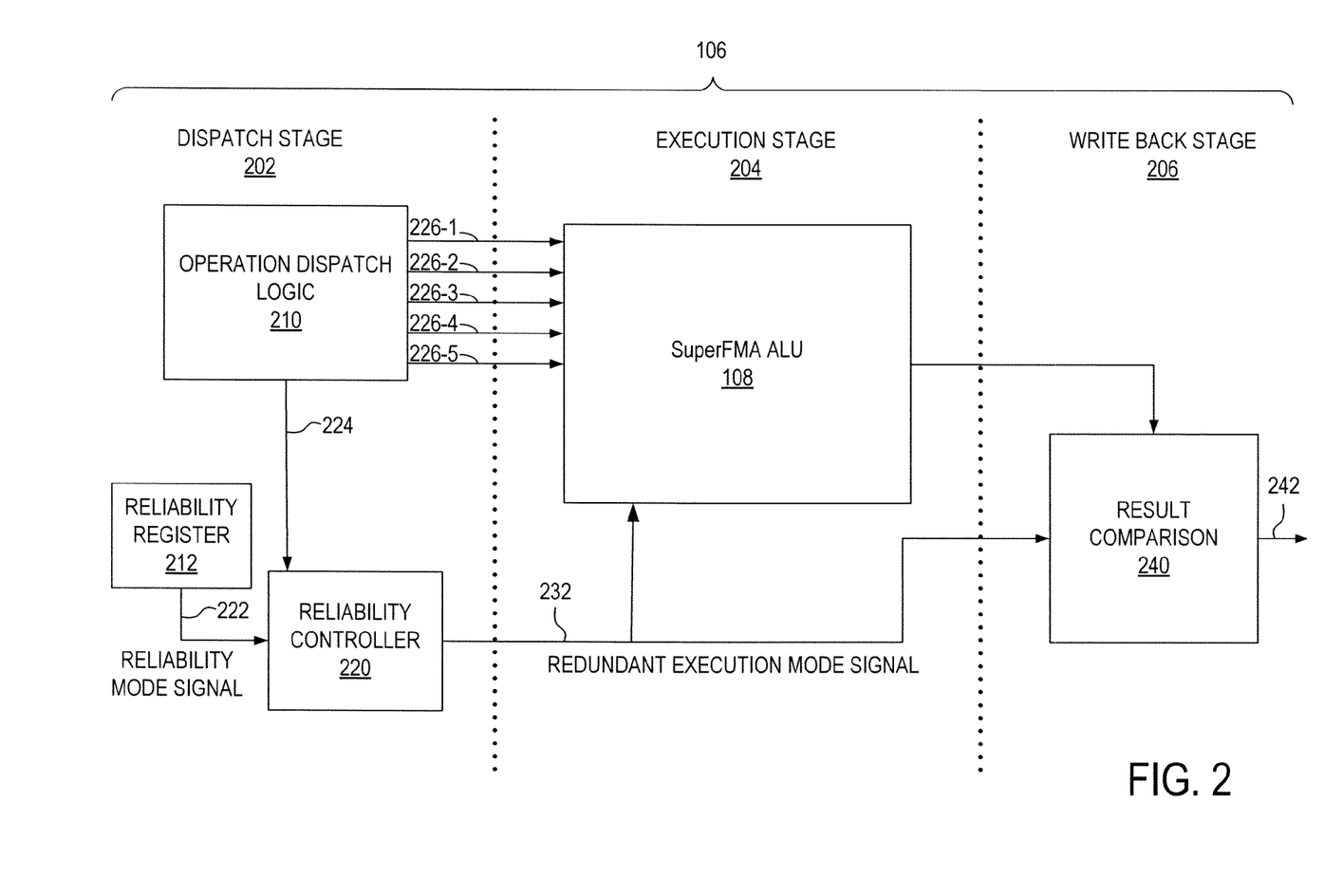
FIG. 2 illustrates stages of an arithmetic logic unit used in conjunction with at least one embodiment.

Referring now to FIG. 2, one embodiment of execution pipeline 106 including a SuperFMA ALU 108 and control logic to leverage underutilized resources of SuperFMA ALU 108 for improved reliability is illustrated. FIG. 2 illustrates conceptualized boundaries 201 between adjacent stages of execution pipeline 206. In the FIG. 2 embodiment, a first boundary 201-1 is illustrated between a dispatch stage 202 and an execution stage 204 while a second boundary 201-2 is illustrated between execution stage 204 and a write back stage 206. Although the FIG. 2 embodiment depicts three pipeline stages, other embodiments may employ more for fewer pipeline stages.

In the FIG. 2 embodiment, dispatch logic 210 determines an operation to be performed by SuperFMA ALU 108, provides a plurality of input operands 226 to SuperFMA ALU 108, and sends an operation signal 224 to a reliability controller 220. In the FIG. 2 embodiment, SuperFMA ALU 108 supports as many as five floating point inputs 226-1 through 226-5 and dispatch logic 210 provides as many as five inputs 226 to SuperFMA 108. Other embodiments may support more or fewer inputs, integer or floating point. In at least one embodiment, the operation signal 224 indicates the operation to be performed by SuperFMA ALU 108, whether the operation to be performed can be performed using spatial redundancy, or both. For example, if dispatch logic 210 determines that SuperFMA ALU 108 is going to perform be in SuperFMA ALU 108, operation signal 224 may include information indicative of the SuperFMA operation itself, information indicating that SuperFMA ALU 108 cannot execute the instruction using spatial redundancy, or both.

In the FIG. 2 embodiment, operation signal 224 is provided to a reliability controller 220 that generates a redundant execution mode signal 232. In the FIG. 2 embodiment, redundant execution mode signal 232 is provided to SuperFMA ALU 108 to control its operation and, more specifically, to control its use of resources to perform redundant execution. Reliability controller 220 also receives, in addition to operation signal 224, a reliability mode signal 222. As suggested by its name, reliability mode signal 212 may indicate one of multiple reliability modes in which execution pipeline 106 may operate. The various reliability modes may include high reliability modes that aggressively attempt to leverage unused ALU resources for performing operations redundantly and thereby more reliably. The reliability modes may further include modes that are more relaxed in terms of initiating redundant execution, but consume less power, generate less heat, or exhibit some other desirable operating characteristic in exchange for a reduction in the amount of redundant execution employed.

As indicated above, the use of unused resources to perform redundant execution can be implemented in various degrees and an representative embodiment that employs three levels of redundant execution will be described. At least one embodiment, execution pipeline 106 supports three different reliability modes, namely, a mandatory mode, an opportunistic mode, and a reluctant mode. In the mandatory mode, all operations are executed redundantly. If SuperFMA ALU 108 can execute an operation using spatial redundancy, it does so. When SuperFMA 108 cannot perform the operation using spatial redundancy, SuperFMA ALU 108 may perform the operation using temporal redundancy. Temporal redundancy refers to a procedure in which an operation is performed multiple times by the same hardware to determine if each instance of performing the operation produces the same result.

In at least one embodiment of the opportunistic mode, operations that may be executed in a spatially redundant manner are executed redundantly while operations that cannot be executed redundantly or operations that can only be executed with temporal redundancy are executed without redundancy. Finally, in an embodiment of the reluctant mode, operations that support redundant execution may execute redundantly subject to additional criteria while operations that cannot be executed using spatial redundancy are executed without redundancy. In this mode, the additional criteria that influence wither an operation is executed redundantly may include, but is not limited to, criteria pertaining to power consumption, device temperature, and so forth. For example, a reluctant policy might executed applicable operations redundantly as long as power consumption has been averaging below a specified threshold. Similarly, redundant execution criteria may include criteria specifying a particular power management mode, e.g., a device in a power conservation may prohibit or discourage redundant execution. As another example, criteria influencing whether to execute an instruction redundantly may include a simple percentage indicating approximately what percentage of operations that are eligible for redundant execution are executed redundantly.

Returning to FIG. 2, the FIG. 2 embodiment of reliability controller 220 thus receives information regarding an operation to be performed, information indicating whether the operation can be performed redundantly, and information indicating a current reliability mode of the processor. From this information, at least one embodiment of reliability controller 220 generates a control signal identified in FIG. 2 as redundant execution mode signal 232. In the embodiment illustrated in FIG. 2, redundant execution mode signal 232 is provided to SuperFMA ALU 108 and result comparator logic 240 to indicate or control the use of redundant execution by SuperFMA ALU 108.

In at least one embodiment of write back stage 206, redundant execution control signal 232 from reliability controller 220 is provided to a result comparator 240 to indicate whether result comparator 240 is needed to compare two results generated by redundant executions of the same operation by SuperFMA ALU 108. When redundant execution mode signal 232 indicates that SuperFMA ALU 108 is being operated in redundant execution mode, comparison block 240 compares the redundant results from SuperFMA ALU 108 to determine if they match. Otherwise, an error signal 242 is generated.

Figure 3:
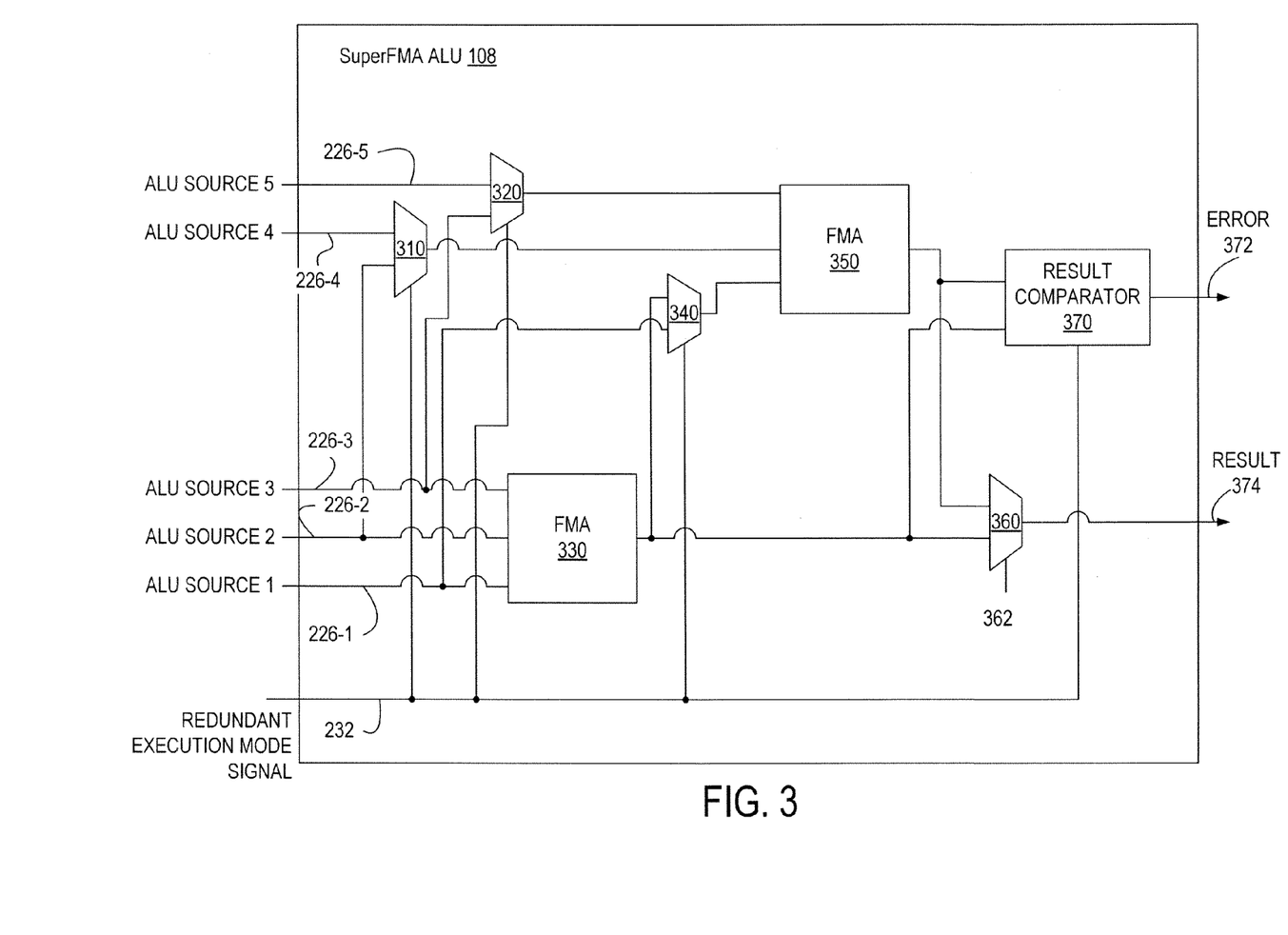
FIG. 3 illustrates an arithmetic logic unit used in conjunction with at least one embodiment.

Referring now to FIG. 3, one embodiment of a hardware configuration of SuperFMA ALU 108 supporting redundant execution is illustrated. The FIG. 3 embodiment of Super-FMA ALU 108 includes a first FMA ALU 330 and a second FMA ALU 350, which may be used in combination to perform a fully pipelined, 5-input, floating point SuperFMA operation of the form A*B+(C*D+E).

In the FIG. 3 embodiment, first FMA 330 performs a fused multiply-add computation using ALU Source 3 226-3, ALU Source 2 226-2 and ALU Source 1 226-1. This computation may then be sent as an input to multiplexor 360. In parallel or substantially in parallel, second FMA 350 performs a fused multiply-add computation using the outputs of multiplexors 310, 320 and 340. Depending on the redundant execute mode signal 232, second FMA 350 may perform the second part of a SuperFMA operation by performing an FMA adding the output of first FMA 330 to the product of source 4 226-4 and source 5 226-5. Alternatively, the redundant execution mode signal 232 may cause FMA 350 to function as a redundant source of the FMA operation of FMA 330.

In the FIG. 3 embodiment, result comparator 370 receives a first result generated by first FMA 330 and a second result generated by second FMA 350. When redundant execution mode signal 232 indicates to result comparator 370 that the FMAs 330 and 350 are being used in redundant fashion, result comparator 370 asserts or generates an error signal 372 indicating that the redundant executions do not match. Alternatively, when redundant execution mode signal 232 indicates that FMAs 330 and 350 are being used cooperatively to perform a SuperFMA operation, the output of result comparator 370 is ignored and, instead, the output of second FMA 350 is routed through multiplexer 360 to drive a result signal 374. In the FIG. 3 embodiment, a control signal 362 for multiplexer 360 may be asserted when the operation being performed is a SuperFMA.

Thus, by integrating four multiplexers and a comparator with the pair of FMA units 330 and 350, SuperFMA ALU 108 is operable not only to perform SuperFMA operations, but also to perform less complex operations using spatial redundancy be executing one instance of an operation in FMA 330 and another instance of the FMA in FMA 350. The cost of these additional logic components is relatively low with respect to the added functional benefit. No additional ports need to be added to the register files and the required changes are concentrated in the ALU itself.

Figure 4:
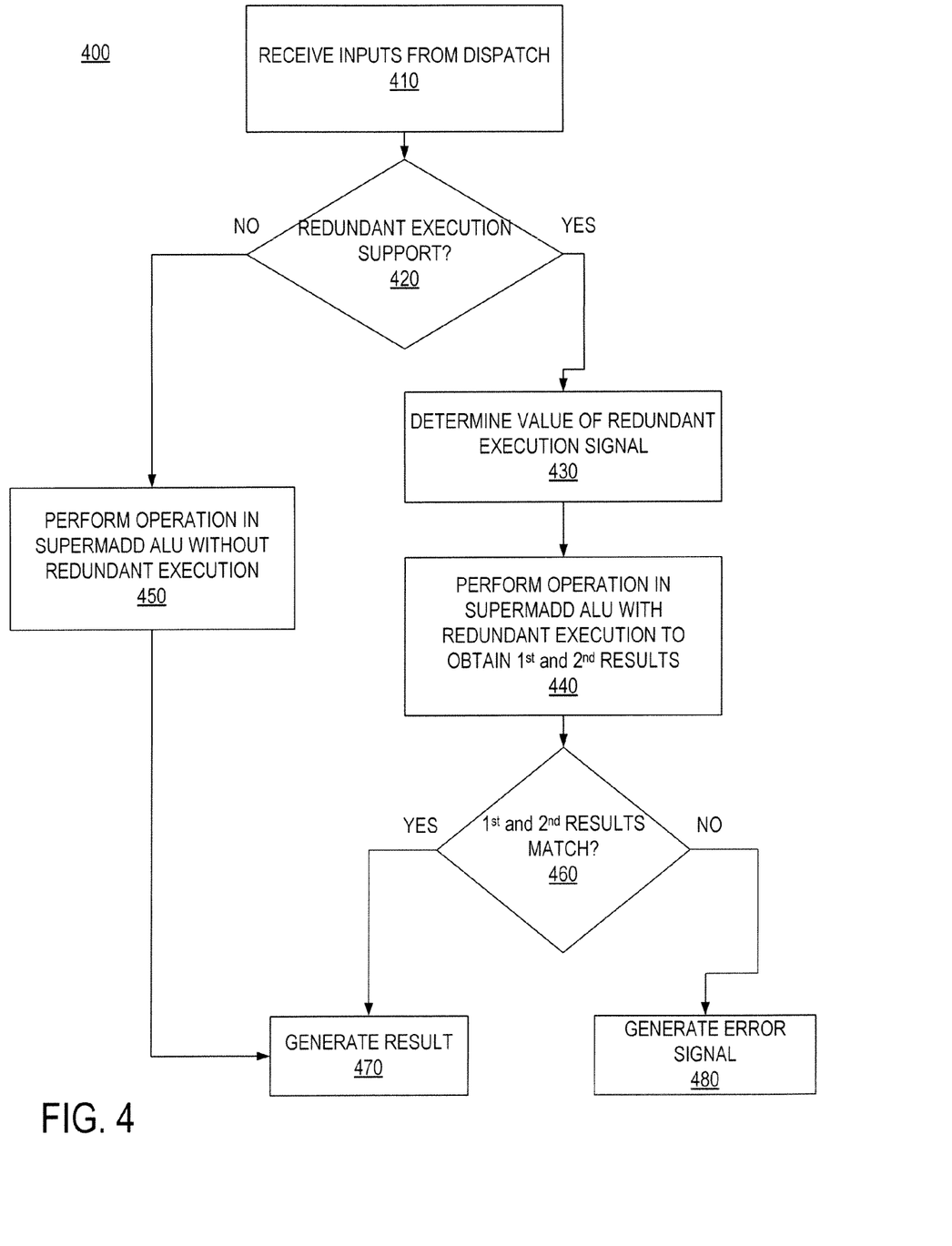
FIG. 4 illustrates one embodiment of an instruction execution method.

Referring now to FIG. 4, a flow diagram illustrates one embodiment of a method 400 for improving computational reliability in a processor that includes a SuperFMA ALU. In the FIG. 4 embodiment, method 410 includes receiving (operation 410) operand inputs from dispatch logic to perform an operation with the SuperFMA ALU. The embodiment of method 400 depicted in FIG. 4 determines (operation 420) whether the SuperFMA ALU can provide redundant execution support for the operations. Unless the pending operation is a SuperFMA operation, method 400 proceeds to operation 430 where, assuming the redundant execution mode signal permits it, an ALU operation is performed (operation 440) using spatial redundancy to obtain first and second results of the operation with the first result being generated by the first FMA logic and the second result being generated by the second FMA logic. As described previously, redundant execution can be implemented in a mandatory, opportunistic, or reluctant fashion in reference to FIG. 2.

As depicted in FIG. 4, method 400 further includes determining (block 460) whether the first and second results match. When the results match, the embodiment of method 400 illustrated in FIG. 4 generates a result (operation 470) that is reliability tested through redundant execution. When the results of the redundantly execution operation do not match method 400 as shown in FIG. 4 generates an error signal (operation 480).

If it is determined in operation 420 that the ALU operation cannot be executed with redundant execution support, the flow continues to process block 450 where the operation is performed in the SuperFMA ALU without redundant execution and the computational result is generated in 470.

Figure 5:
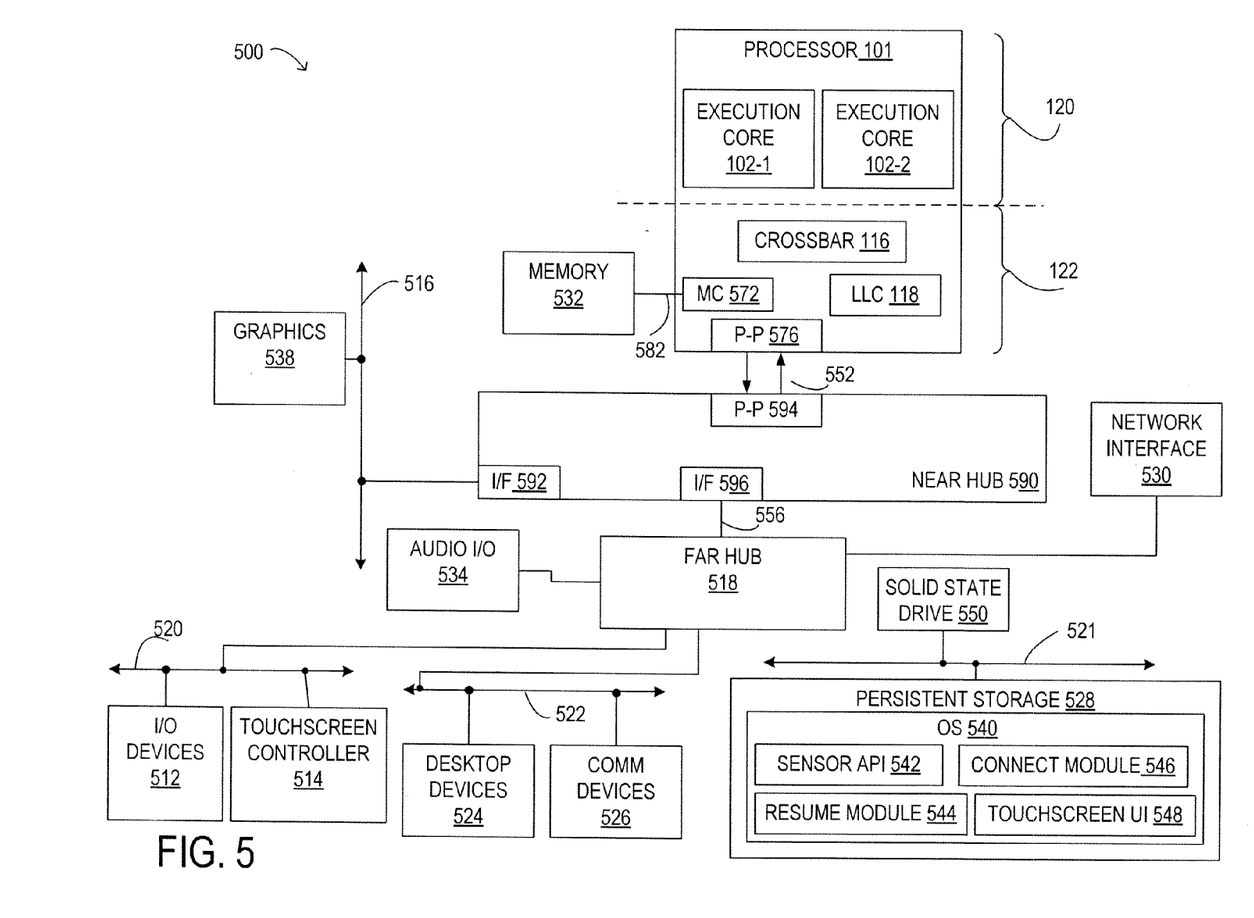
FIG. 5 illustrates a computer system used in conjunction with at least one embodiment.

Embodiments of processor 101 (FIG. 1) and SuperFMA ALU 106 may be implemented in many different types of systems and platforms. Referring now to FIG. 5, a computing system 500 is illustrated in accordance with one embodiment. In the FIG. 5 embodiment of system 500, processor 101, memory 532, and chip set devices are interconnected by a number of point-to-point (P-P) interfaces, as will be described in further detail. In other embodiments, computing system 500 may employ a different interconnection technology, different bus architectures, such as a front side bus, a multi-drop bus, and/or another implementation, and so forth. Although a single processor 101 is depicted in the example embodiment of FIG. 5 for descriptive clarity, in various embodiments, a different number of processors may be employed using elements of the depicted architecture.

In FIG. 5, computer system 500 is a point-to-point interconnect system that includes a processor 101 employing multiple execution cores 102-1 and second execution core 102-2. It is noted that other elements of processor 101 besides execution cores 102 may be referred to as an uncore region 122, while execution cores 102 may be referred to as core region 120. In different embodiments (not shown in FIG. 5), a varying number of cores may be present in a particular processor. Execution cores 102 may comprise a number of sub-system, that provide different aspects of overall functionality. For example, execution cores 102 may each include a cache memory hierarchy (not shown in FIG. 5) that may comprise one or more levels of private cache memory.

In the FIG. 5 embodiment, execution cores 102 within processor 101 do not include direct means of communicating with each other, but instead, communicate via crossbar 116, which may include intelligent functionality such as cache control functionality, data queuing, P-P protocols, and multicore interfacing. Crossbar 116 may thus represent an intelligent uncore controller that interconnects execution cores 102 with memory controller (MC) 572, last-level cache memory (LLC) 118, and P-P interface 576, among other elements.

In FIG. 5, LLC 118 may be coupled to a pair of processor execution cores 102, respectively. For example, LLC 118 may be shared by execution core 102-1 and execution core 102-2. LLC 118 may be fully shared such that any single one of execution cores 102 may fill or access the full storage capacity of LLC 118. Additionally, MC 572 may provide for direct access by processor 101 to memory 532 via memory interface 582. For example, memory 532 may be a double-data rate (DDR) type dynamic random-access memory (DRAM) while memory interface 582 and MC 572 comply with a DDR interface specification. Memory 532 may represent a bank of memory interfaces (or slots) that may be populated with corresponding memory circuits for a desired DRAM capacity.

Processor 101 may also communicate with other elements of processor system 500, such as near hub 590 and far hub 518, which are also collectively referred to as a chipset that supports processor 101. P-P interface 576 may be used by processor 101 to communicate with near hub 590 via interconnect link 552. In certain embodiments, P-P interfaces 576, 594 and interconnect link 552 are implemented using Intel QuickPath Interconnect architecture.

As shown in FIG. 5, near hub 590 includes interface 592 to couple near hub 590 with first bus 516, which may support high-performance I/O with corresponding bus devices, such as graphics 538 and/or other bus devices. Graphics 538 may represent a high-performance graphics engine that outputs to a display device (not shown in FIG. 8). In one embodiment, first bus 516 is a Peripheral Component Interconnect (PCI) bus, such as a PCI Express (PCIe) bus and/or another computer expansion bus. Near hub 590 may also be coupled to far hub 518 at interface 596 via interconnect link 556. In certain embodiments, interface 596 is referred to as a south bridge. Far hub 518 may provide I/O interconnections for various computer system peripheral devices and interfaces and may provide backward compatibility with legacy computer system peripheral devices and interfaces. Thus, far hub 518 is shown providing network interface 530 and audio I/O 534, as well as, providing interfaces to second bus 520, third bus 522, and fourth bus 521.

Second bus 520 may support expanded functionality for microprocessor system 500 with I/O devices 512 and touchscreen controller 514, and may be a PCI-type computer bus. Third bus 522 may be a peripheral bus for end-user consumer devices, represented by desktop devices 524 and communication devices 526, which may include various types of keyboards, computer mice, communication devices, data storage devices, bus expansion devices, etc. In certain embodiments, third bus 522 represents a Universal Serial Bus (USB) or similar peripheral interconnect bus. Fourth bus 521 may represent a computer interface bus for connecting mass storage devices, such as hard disk drives, optical drives, disk arrays, which are generically represented by persistent storage 528 that may be executable by processor 101.

The FIG. 5 embodiment of system 500 emphasizes a computer system that incorporates various features that facilitate handheld or tablet type of operation and other features that facilitate laptop or desktop operation. In addition, the FIG. 5 embodiment of system 500 includes features that cooperate to aggressively conserve power while simultaneously reducing latency associated with traditional power conservation states.

The FIG. 5 embodiment of system 500 includes an operating system 540 that may be entirely or partially stored in a persistent storage 528. Operating system 540 may include various modules, application programming interfaces, and the like that expose to varying degrees various hardware and software features of system 500. The FIG. 5 embodiment of system 500 includes, for example, a sensor application programming interface (API) 542, a resume module 544, a connect module 546, and a touchscreen user interface 548. System 500 as depicted in FIG. 5 may further include various hardware/firm features include a capacitive or resistive touch screen controller 514 and a second source of persistent storage such as a solid state drive 550.

Sensor API 542 provides application program access to one or more sensors (not depicted) that may be included in system 500. Examples of sensors that system 500 might have include, as examples, an accelerometer, a global positioning system (GPS) device, a gyro meter, an inclinometer, and a light sensor. The resume module 544 may be implemented as software that, when executed, performs operations for reducing latency when transition system 500 from a power conservation state to an operating state. Resume module 544 may work in conjunction with the solid state drive (SSD) 550 to reduce the amount of SSD storage required when system 500 enters a power conservation mode. Resume module 544 may, for example, flush standby and temporary memory pages before transitioning to a sleep mode. By reducing the amount of system memory space that system 500 is required to preserve upon entering a low power state, resume module 544 beneficially reduces the amount of time required to perform the transition from the low power state to an operating state. The connect module 546 may include software instructions that, when executed, perform complementary functions for conserving power while reducing the amount of latency or delay associated with traditional "wake up" sequences. For example, connect module 546 may periodically update certain "dynamic" applications including, as examples, email and social network applications, so that, when system 500 wakes from a low power mode, the applications that are often most likely to require refreshing are up to date. The touchscreen user interface 548 supports a touchscreen controller 514 that enables user input via touchscreens traditionally reserved for handheld applications. In the FIG. 5 embodiment, the inclusion of touchscreen support in conjunction with support for communication devices 526 and the enable system 500 to provide features traditionally found in dedicated tablet devices as well as features found in dedicated laptop and desktop type systems.

Figure 6:
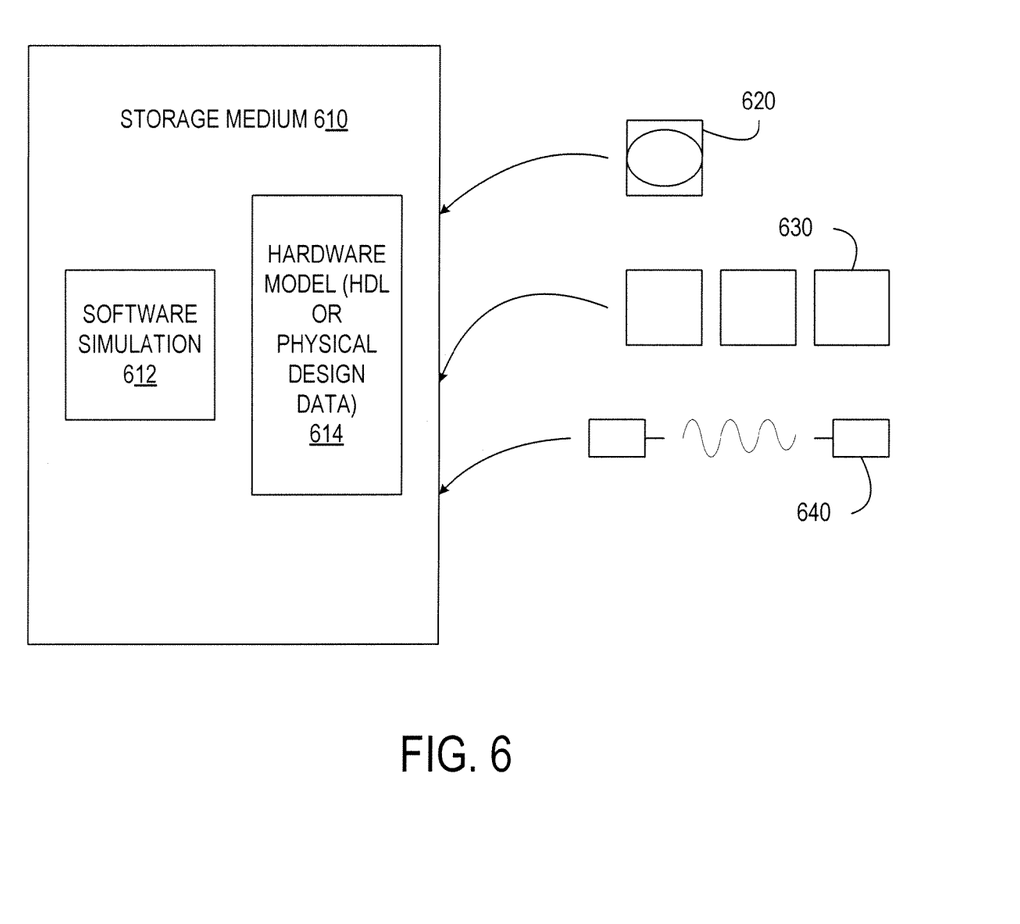
FIG. 6 illustrates design data used in conjunction with at least one embodiment.

Referring now to FIG. 6, a representation of simulation, emulation and fabrication of a design implementing disclosed embodiments of SuperFMA ALU 108 (FIG. 1) is illustrated in the context of data stored on a storage medium 610. Data representing a design may represent the design in a number of manners. First, as is useful in simulations, the hardware may be represented using a hardware description language or another functional description language that provides a computerized model of how the designed hardware is expected to perform. The hardware model 614 may be stored in storage medium 610 such as a computer memory so that the model may be simulated using simulation software 612 that applies a particular test suite to the hardware model 614 to determine if it indeed functions as intended. In some embodiments, the simulation software 612 is not recorded, captured, or contained in the medium 610.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable storage medium 610 storing a model of processor 101 and SuperFMA ALU 108.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. An optical or electrical wave 640 modulated or otherwise generated to transmit such information, a memory 630, or a magnetic or optical storage 620 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor, comprising:
   a front end to fetch instructions and decode fetched instructions into operations; and
   an arithmetic logic unit (ALU) to execute an ALU operation, wherein the ALU includes logic to:
      receive input operands from dispatch logic;
      determine whether the ALU operation is eligible to execute with spatial redundancy;
      determine a redundant execution mode of the ALU;
      perform the operation in the ALU without spatially redundant execution when the ALU operation is ineligible; and
      perform the operation in the ALU with spatially redundant execution, to generate a first result and a second result, when the ALU operation is eligible and the redundant execution mode permits spatially redundant execution.

2. The processor of claim 1, wherein the ALU includes logic to:
   generate an error signal when the first result and the second result do not match.

3. The processor of claim 1, wherein the ALU includes:
   first fused multiply-add (FMA) logic to receive first, second, and third input operands and perform a first FMA operation represented by A*B+C to produce the first result, where A, B, and C represent floating point values;
   second FMA logic to receive fourth and fifth input operands and the first result and to perform a second FMA operation to produce the second result.

4. The processor of claim 1, wherein the ALU includes:
   dispatch logic to send a detection signal indicative of the ALU operation; and
   a reliability controller to:
      receive the detection signal and a signal indicating the redundant execution mode; and
      generate a redundant execution control signal based on the detection signal and the signal indicating the redundant execution mode.

5. The processor of claim 4, wherein the signal indicating the redundant execution mode indicates a value of a programmable reliability register.

6. The processor of claim 1, wherein the redundant execution mode includes a mandatory mode that, when invoked, causes the ALU to execute all eligible operations with spatial redundancy and to execute all ineligible operations with temporal redundancy.

7. The processor of claim 1, wherein the redundant execution mode includes an opportunistic mode that, when invoked, causes the ALU to execute all eligible operations with spatial redundancy and to execute all ineligible operations without redundancy.

8. The processor of claim 1, wherein the redundant execution mode includes a reluctant mode that, when invoked, causes the ALU to execute an eligible instruction with spatial redundancy subject to additional criteria.

9. A system, comprising:
   first storage including an operating system and I/O configuration data to indicate a memory address associated with an I/O device;
   an I/O hub to interface to a processor;
   an I/O device to interface to the I/O hub;
   wherein the operating system includes:
      processor-executable resume module instructions to reduce latency associated with transitioning from a power conservation state: and
      processor-executable connect module instructions to maintain a currency of a dynamic application during the power conservation state; and
   the processor including an execution core, comprising:
      a front end to fetch and decode instruction bytes into operations;

a L1 data cache to store copies of data most frequently used by the execution core;
an execution pipeline to execute an operation, wherein the execution pipeline includes a SuperFMA ALU to:
receive inputs from operation dispatch to perform an operation with the SuperFMA ALU;
responsive to identifying the operation as not supporting redundant execution, perform the operation in the SuperFMA ALU without redundant execution and generate a computational result;
responsive to identifying the operation as supporting redundant execution, determine a redundant execution mode indicated by a redundant execution signal, perform the operation in the SuperFMA ALU with redundant execution to obtain a first and second result, determine if the first and second results match and generate a computational result.

10. The system of claim 9, when a redundant execution occurs, responsive to the first and second results of the redundant execution of SuperFMA computations not matching:
generate an error.

11. The system of claim 9, wherein redundant execution may be controlled by multiple different modes.

12. The system of claim 11, wherein the redundant execution modes include: mandatory, aggressively opportunistic, and reluctant.

13. The system of claim 12, wherein the reluctant redundant execution mode is selected based on additional criteria being met.

14. The system of claim 13, wherein the additional criteria includes a criterion selected from: percentage of time and signals from a power management scheme.

15. The system of claim 9, wherein the SuperFMA ALU computation is the operation encompassing two dependent fused multiply-add operations and is represented by A*B+ (C*D+E), where A, B, C, D, and E represent floating point values.

16. A method, comprising:
receiving operand inputs associated with an arithmetic logic unit (ALU) operation;
determining whether the ALU supports redundant execution of the ALU operation;
when the ALU does not support spatially redundant execution of the ALU operation:
performing the ALU operation based on the operand inputs without redundant execution;
when the ALU supports spatially redundant execution of the ALU operation:
determining whether a redundant execution mode prevents spatially redundant execution of the ALU operation;
when the redundant execution mode does not prevent spatially redundant execution, performing the ALU operation, based on the operand inputs, with spatially redundant execution to obtain a first result and a second result;
generating a computational result when the first result and the second result match; and
generating an error signal when the first result and the second result do not match.

17. The method of claim 16, wherein determining whether the ALU supports redundant execution of the ALU operation includes:
determining whether the ALU includes sufficient resources to execute two contemporaneous independent instances of the operation.

18. The method of claim 16, further comprising:
when the ALU does not support spatially redundant execution of the ALU operation, performing the ALU operation with temporal redundancy to obtain a first result and a second result.

19. The method of claim 16, wherein the redundant execution mode is selected from a set of execution modes including a mandatory mode, an opportunistic mode, and a reluctant mode.

20. The method of claim 19, wherein the mandatory mode requires the ALU to execute all eligible operations with spatial redundancy and to execute all ineligible operations with temporal redundancy.

21. The method of claim 19, wherein the opportunistic mode requires the ALU to execute all eligible operations with spatial redundancy and to execute all ineligible operations without redundancy.

22. The method of claim 19, wherein the reluctant mode permits the ALU to execute an eligible instruction with spatial redundancy subject to additional criteria.

23. The method of claim 22, wherein the additional criteria include a power mode criterion.

24. The method of claim 16, wherein the ALU includes resources to support contemporaneous execution of two fused multiply-add operations of the form A*B+C, where A, B, and C represent floating point values.

25. The method of claim 16, wherein receiving the operand inputs includes:
receiving, by first fused multiply-add (FMA) logic, first, second, and third operand inputs to produce a first FMA output; and
receiving, by second FMA logic, the first FMA output and fourth and fifth operand inputs and the first FMA output as an output.

* * * * *